Feb. 8, 1955     O. K. COLEMAN     2,701,859
METER WITH TEST FACILITIES
Filed Feb. 6, 1951
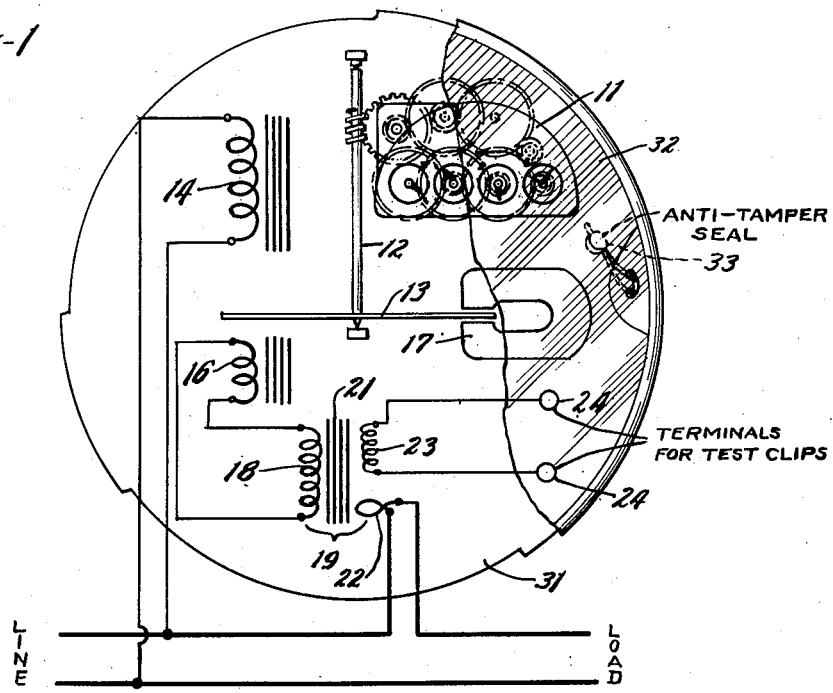
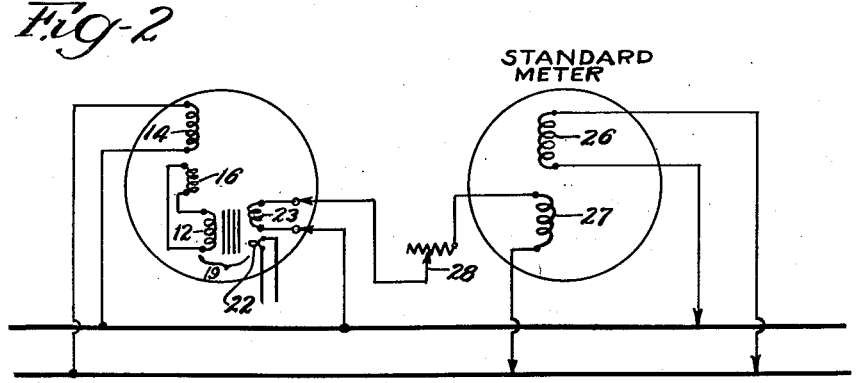
INVENTOR.
Orville K. Coleman
BY
Louis Robertson
Atty.

United States Patent Office 2,701,859
Patented Feb. 8, 1955

2,701,859
METER WITH TEST FACILITIES

Orville K. Coleman, West Lafayette, Ind., assignor to Duncan Electric Manufacturing Company, Lafayette, Ind., a corporation of Illinois Application February 6, 1951, Serial No. 209,613

1 Claim. (Cl. 324—74)

In metering heavy-duty electric service lines, it is a common practice to use current transformers, so that a smaller current can be passed through the current coils of the meter than the current actually being measured. The testing of such meters with relatively simple equipment which is commonly available for testing in the field has been troublesome.

According to the present invention, this testing is greatly facilitated by providing on the current transformer a normally idle winding of an appropriate number of turns for applying to its terminals a current much lower than that in the measured circuit but which will produce the same number of ampere turns as are produced by the measured circuit carrying a current load suitable for the test. The terminals to which this special test winding are connected are preferably blind terminals in that they have no facilities for connections except by test clips. Furthermore, they are located within the sealed part of the housing so that no connections can be made to them except when the seal is broken and the housing opened for test or inspection.

Additional objects and advantages will be apparent from the following description and from the drawings.

Designation of figures

Figure 1 is a diagrammatic representation of the meter chosen for illustration shown with its normal connections.

Figure 2 is a diagrammatic view showing the connecting of the meter shown in Fig. 1 to a standard meter for comparison testing.

Although the law requires a full and exact description of at least one form of the invention, such as that which follows, it is, of course, the purpose of a patent to cover each new inventive concept therein no matter how it may later be disguised by variations in form or additions of further improvements; and the appended claim is intended to accomplish this purpose by particularly pointing out the parts, improvements, or combinations in which the inventive concepts are found.

General description

The meter with which the present invention is employed may be any one of various conventional meters. For example, a register 11 may be driven by shaft 12 of disk 13, the disk 13 being inductively driven by a voltage coil 14 and a current coil 16 and retarded by damping magnet 17. A current coil 16 may be energized by a secondary coil 18 of a current transformer 19 with which the present invention is especially concerned. Such current transformers commonly include a core 21, on which the secondary coil 18 is wound and which is energized by a primary winding 22. The primary winding 22 may comprise merely a bus bar or other heavy conductor passing through the core. It should be understood that such current transformers are only used with circuits which carry very heavy current loads so that the winding of the type indicated is sufficient to energize the core and induce in the secondary winding 18 a current proportional to that in primary winding 22.

The testing of meters of this type (more accurately referred to as meter-transformer combinations) has presented some problems. It is desirable that such tests be made through transformer action through transformer 19 so that the test will encompass any conditions caused by the current transformer. This has required the use of very heavy currents such as those which are normally measured by the meter. In many instances, it is very inconvenient to provide such a heavy current for test purposes, especially in connection with field tests.

According to the present invention, a test coil 23 is wound on the core 21. Normally this test coil is an idle coil, being connected only to the terminals 24 and therefore having no effect on the transformer action. During testing, however, the coil 22 will be disconnected and the coil 23 will be used instead with a smaller current.

One test hook-up which may be used is shown in Fig. 2. Here the standard meter includes a voltage coil 26 and a current coil 27, which cooperate to drive the disk of the standard meter. The voltage coil 26 may be connected by test clips across voltage coil 14 of the meter being tested or to the same line conductors to which the latter is connected. Current coil 27 is connected in series with test coil 23 through any suitable regulator 28, any suitable source of current being used, such as test clips applied to the main conductors or to the secondary coil of a transformer, the primary coil of which is connected to the main conductors. The current which is thus passed through coils 27 and 23 may be called the testing current or load, and if supplied by the transformer just mentioned, is known more specifically as a phantom load. Phantom load testing without the use of such a coil as test coil 23 has long been known. Phantom load test circuits are illustrated, for example, in Patent 2,055,687, Green and Holmes.

If desired, the current coil 27 may be energized through a current transformer with a test coil on it corresponding to test coil 23, the testing current being passed through these two test coils in series.

The coil 23 may conveniently be provided with twenty turns, the testing current then being only $\frac{1}{20}$ of the current which it represents, assuming that the primary winding 22 has one turn (or, in other words, passes through the core once).

Coils of this type are not too expensive to be provided during manufacture of all meter current transformer combinations. Such coils are preferably connected to terminals 24 which are positioned within the meter chamber. Meter chambers conventionally include a base 31 and a cover 32, which are sealed together by an antitamper seal 33, such as the conventional twisted wire and lead seal combination. The location of the test terminals 24 within the meter chamber is a safeguard against the possibility that workers who have access to the other parts of the meter may through some misunderstanding make connections to these test terminals. For a similar reason, the test terminals 24 are preferably blind terminals, having no apertures or other facilities for connection to them of any wires except the leads from coil 23, thus making quite apparent that nothing is to be connected to them except test clips.

I claim:

A meter including a base, facilities for applying a cover to the base with an anti-tamper seal for forming a meter chamber, a meter unit at least partially within said chamber and including a current coil and a voltage coil, a current transformer having a core, a secondary coil on the core connected to the current coil and having a heavy line-current conductor passing through the core, leads for connecting said conductor and the voltage coil to the circuit to be measured and a test coil on said core normally idle and connected to blind terminals within the meter chamber for the application thereto of test clips in testing the meter, said test coil having a larger number of turns on the core than provided by the conductor to provide the same number of ampere turns about the core with a given test current as would be provided by a larger current value in said conductor.

References Cited in the file of this patent
UNITED STATES PATENTS

| 1,587,841 | Knopp | June 8, 1926 |
| 2,390,811 | Petzinger | Dec. 11, 1945 |